(12) United States Patent
Pakhchyan et al.

(10) Patent No.: US 8,087,811 B2
(45) Date of Patent: Jan. 3, 2012

(54) DISPLAY

(75) Inventors: Edward Pakhchyan, Burbank, CA (US); Haik Mesropian, Glendale, CA (US); Syuzi Pakhchyan, Glendale, CA (US)

(73) Assignee: Edward Pakhchyan

( * ) Notice: Subject to any disclaimer, the term of this patent is extended or adjusted under 35 U.S.C. 154(b) by 710 days.

(21) Appl. No.: 12/004,115

(22) Filed: Dec. 19, 2007

(65) Prior Publication Data

US 2009/0161368 A1 Jun. 25, 2009

(51) Int. Cl.
*F21V 7/04* (2006.01)

(52) U.S. Cl. ......... 362/606; 362/617; 362/619; 362/620

(58) Field of Classification Search .......... 362/606–607, 362/617–620; 385/901
See application file for complete search history.

(56) References Cited

U.S. PATENT DOCUMENTS

| | | | |
|---|---|---|---|
| 5,009,483 A | 4/1991 | Rockwell, III | |
| 5,078,479 A | 1/1992 | Vuilleumier | |
| 5,771,321 A | 6/1998 | Stern | |
| 5,914,760 A * | 6/1999 | Daiku | 349/65 |
| 5,953,469 A | 9/1999 | Zhou | |
| 6,031,656 A * | 2/2000 | Little et al. | 359/293 |
| 6,224,223 B1 * | 5/2001 | Higuchi et al. | 362/618 |
| 7,236,663 B2 | 6/2007 | Wakita et al. | |
| 7,740,375 B2 * | 6/2010 | Zou et al. | 362/247 |
| 7,876,489 B2 * | 1/2011 | Gandhi et al. | 359/242 |

* cited by examiner

*Primary Examiner* — Diane Lee
*Assistant Examiner* — Sean Gramling

(57) ABSTRACT

A display including a light source for generating light, an optical waveguide for receiving and evenly distributing light in a light propagation direction by total internal reflections and a matrix of picture elements constructed on the upper surface of the waveguide, the picture elements including electrically activated micro-mechanical actuators having optical properties for modulating light to produce an image.

19 Claims, 6 Drawing Sheets

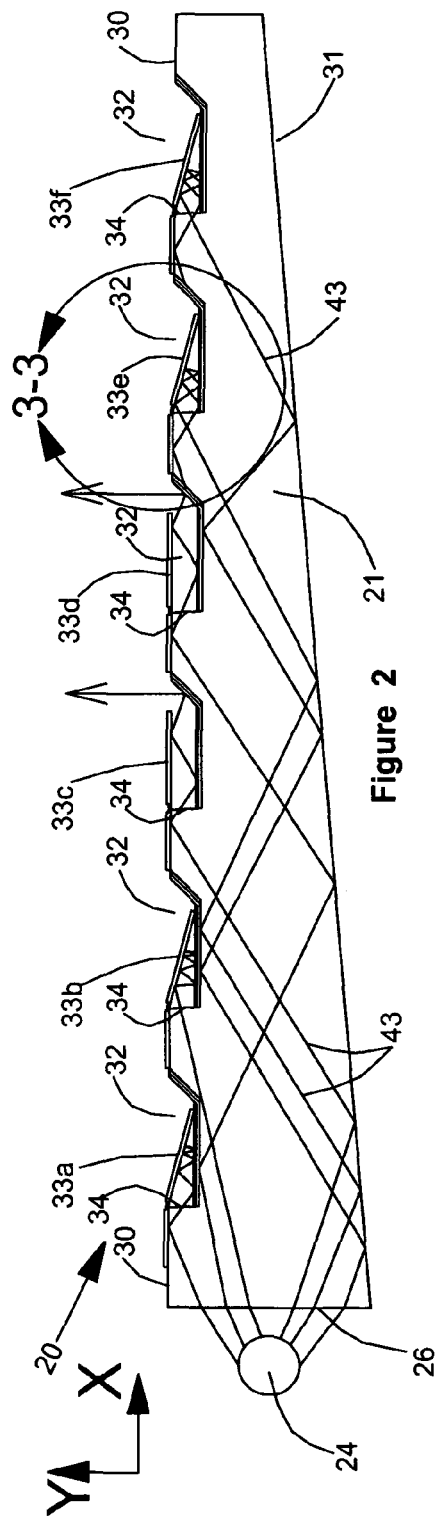
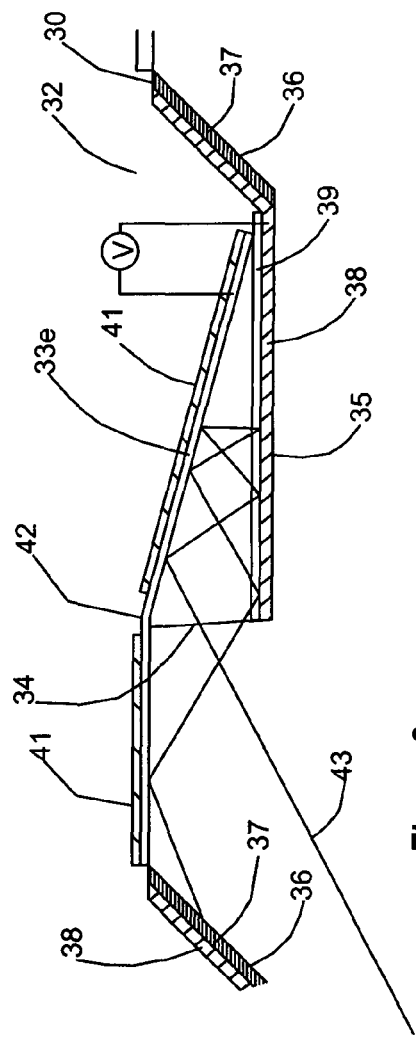
Figure 2
Figure 3

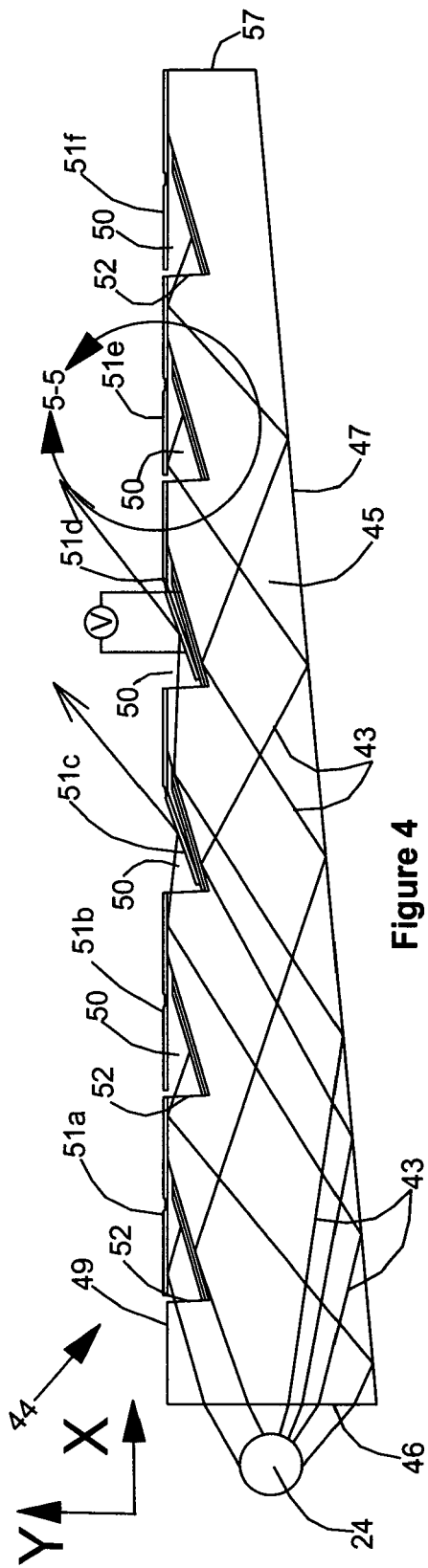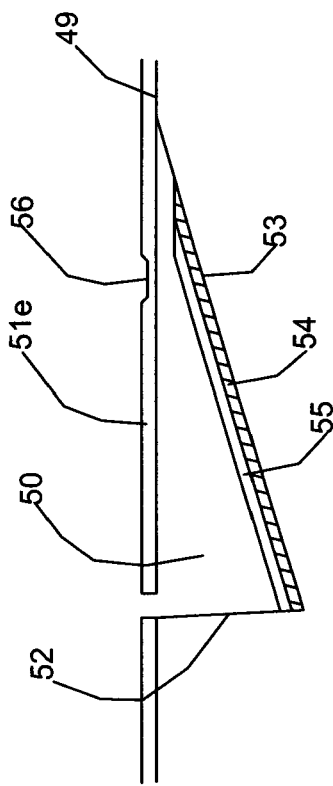
Figure 4
Figure 5

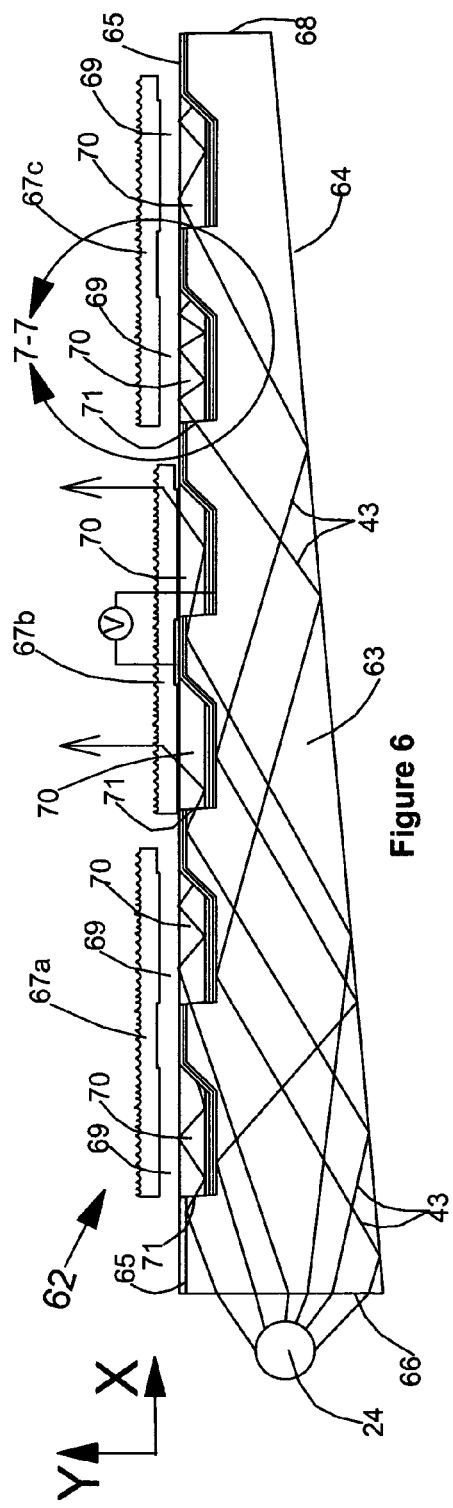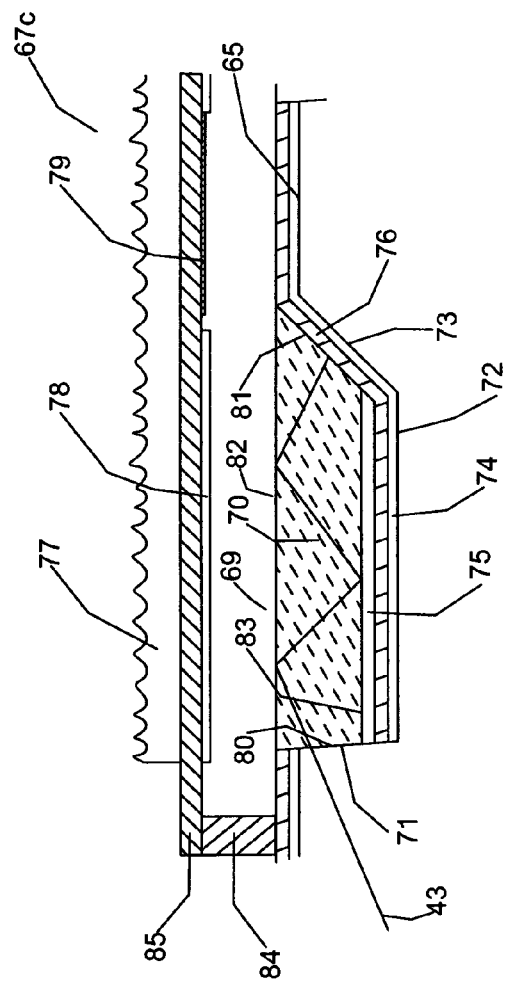
Figure 6
Figure 7

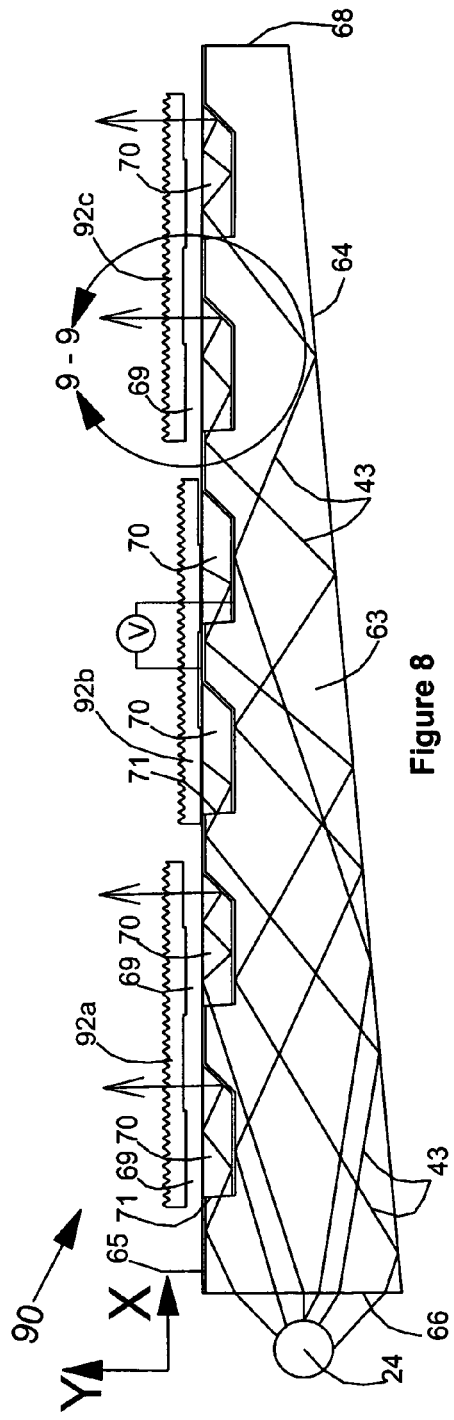
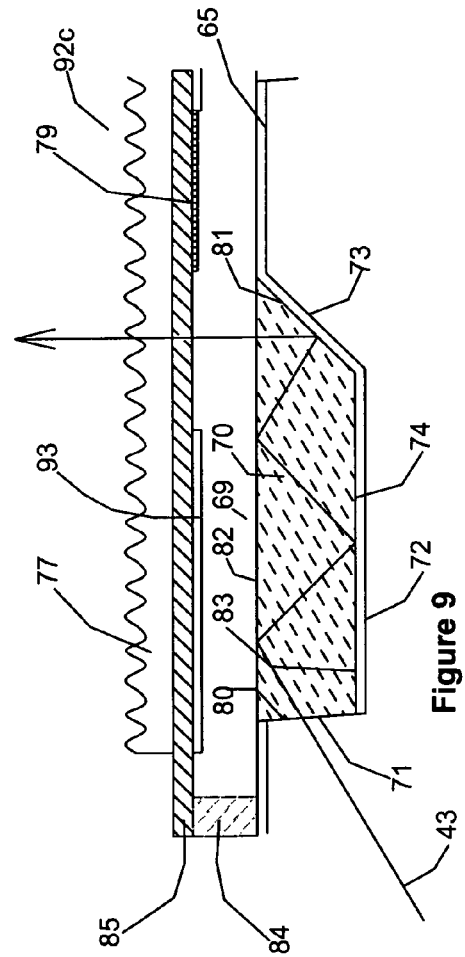
Figure 8
Figure 9

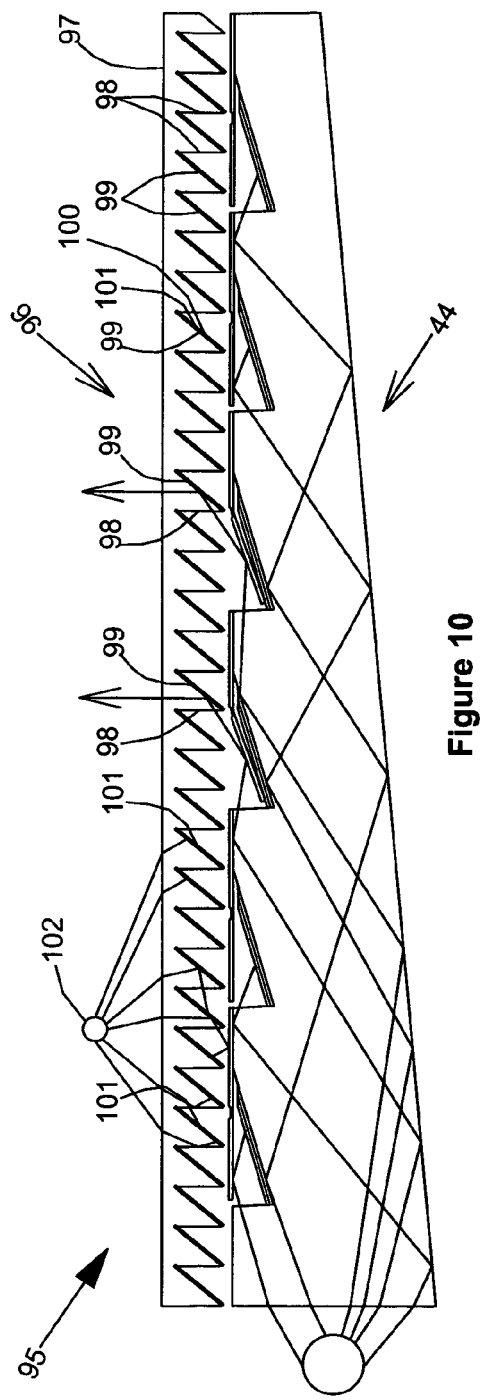
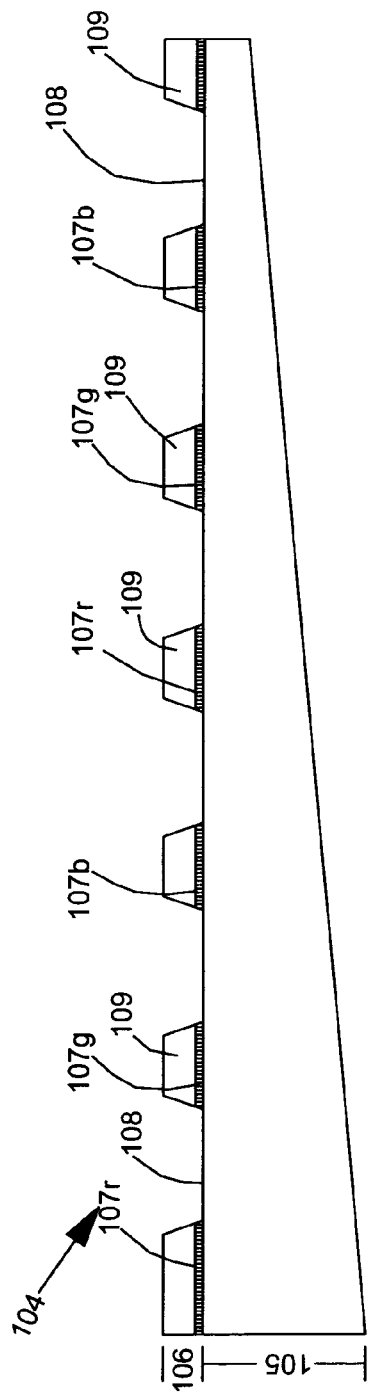

DISPLAY

BACKGROUND OF THE INVENTION

1. Field of the Invention

The present invention relates generally to displays. More particularly the invention concerns displays comprising an optical waveguide, a light source and a plurality of electrically activated micro-mechanical actuators with optical properties.

2. Discussion of the Prior Art

Currently liquid crystal displays dominate the flat panel display market. Prior art liquid crystal displays typically comprise a backlight assembly for illumination, light polarizers, color and neutral density filters, and an active matrix liquid crystal layer with thin-film-transistor backplanes. The overall light efficiency of a typical prior art liquid crystal display (LCD) is below 10% mainly due to the fact that light from the backlight assembly has to pass several layers of polarizers, color and neutral density filters. A further problem with LCDs is the slow response time of the liquid crystal resulting in objectionable visible motion artifacts when displaying motion images.

Recently, micro-mechanical flat panel displays based on an optical waveguide were proposed as a viable alternate to LCDs. These displays typically consist of a planar waveguide with parallel surfaces on which a matrix of electrically driven micro-mechanical picture elements is constructed. Light from a light source is introduced to the waveguide from one or more sides of the wave guide and is confined within the waveguide by total internal reflections. Light is extracted from the planar surface of the waveguide by coupling to evanescent waves or by deforming the surface of the planar waveguide to produce an image. There is an inherent optical crosstalk problem when picture elements are simultaneously activated to display an image. The state of one picture element changes the brightness of other picture elements. One solution to the optical crosstalk problem is to activate the picture elements sequentially. This requires very fast micro-mechanical actuators and results in very low light efficiency. Displaying color or grey scale images is generally not practical.

Another common problem concerns the use of mirror surfaces to redirect light to the viewer. The same mirror surface reflects the ambient light back to the viewer thereby significantly reducing the contrast at high levels of ambient light.

SUMMARY OF THE INVENTION

It is an object of the present invention to provide a display that effectively overcomes the optical crosstalk problem typically found in prior art optical waveguide-based displays while displaying the entire image simultaneously. In one form of the invention this object is achieved by providing a display that comprises a light source and an optical waveguide. The optical waveguide distributes light to a plurality of light exits. At each light exit a picture element modulates light by selectively directing the light to the viewer or to a light absorber.

Another object of the invention is to provide a high contrast display of the character that operates at high levels of ambient light. Two embodiments of the invention achieve this object by providing a display wherein the majority of the viewing surface is coated with a light-absorbing coating. In the third embodiment of the invention this object is achieved by providing a display which includes a prism film at the upper surface of the display. In this latter embodiment, the prism film redirects light emitting from the display at oblique angles towards the normal so as to improve the viewing angles. The same prism film absorbs most of the ambient light when a light-absorbing coating is applied on the same facets that redirect the display light.

Another object of the invention is to provide a display that can compete with LCD's in light efficiency, picture quality and cost. Increased light efficiency is achieved by providing a display in which light travels most of the light path by total internal reflections and light is modulated by requiring fewer reflections from highly reflective micro-mirrors. Improved picture quality is achieved by providing fast and efficient light modulators.

The foregoing as well as other objects of the invention will be achieved by the novel display illustrated in the accompanying drawings and described in the specification that follows.

BRIEF DESCRIPTION OF THE DRAWINGS

FIG. 2 is an enlarged cross-sectional view taken along lines 2-2 of FIG. 1.

FIG. 3 is a greatly enlarged view of the area designated as 3-3 in FIG. 2.

FIG. 4 is a cross-sectional view of an alternate form of display of the invention.

FIG. 5 is a greatly enlarged view of the area designated as 5-5 in FIG. 4.

FIG. 6 is a cross-sectional view of still another form of display of the invention.

FIG. 7 is a greatly enlarged view of the area designated as 7-7 in FIG. 6.

FIG. 8 is a cross-sectional view of still another form of display of the invention.

FIG. 9 is a greatly enlarged view of the area designated as 9-9 in FIG. 8.

FIG. 10 is a cross-sectional view of yet another form of display of the invention.

FIG. 11 is a cross-sectional view of a waveguide with embedded dichroic mirrors of the invention.

DESCRIPTION OF THE INVENTION

Figure 1:
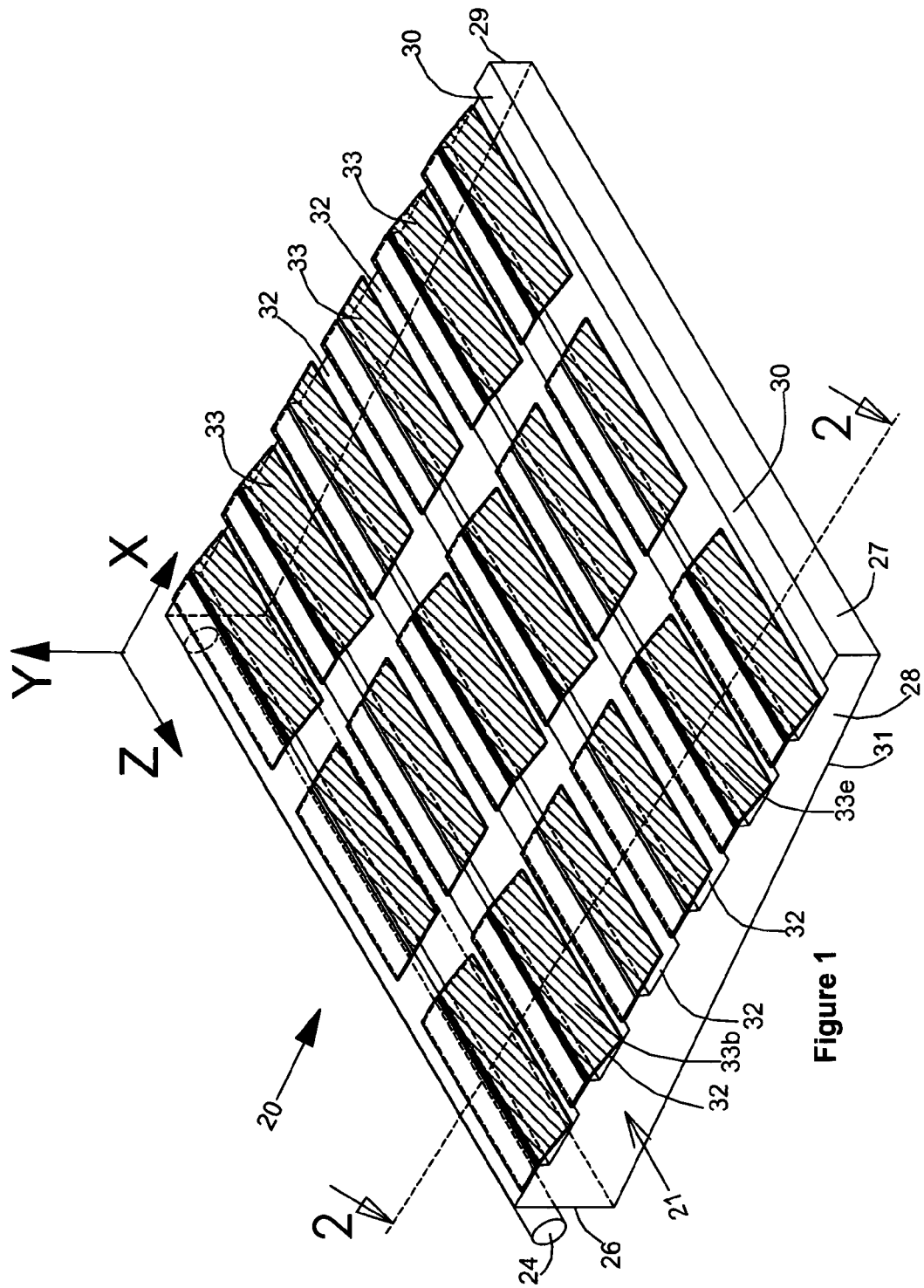
FIG. 1 is a generally perspective view of one form of the display of the present invention.

Referring to the drawings and particularly to FIGS. 1 and 2, one form of the display of the invention is shown there and generally designated by the numeral 20. As best seen in FIG. 1, display 20 here includes a generally rectangular shaped optical waveguide 21 that is a substantially wedge-shaped cross section. Waveguide 21 is preferably constructed from an optically transparent material, such as acrylic or glass and comprises generally parallel first and second end surfaces 26 and 27 that are joined by parallel side surfaces 28 and 29 (see FIG. 1). Waveguide 21 also includes a specially configured major upper surface 30 and an upwardly inclined lower surface 31 (see also FIG. 2). A plurality of substantially equally spaced-apart grooves 32 are formed on upper surface 30 and, as shown in FIG. 1, extend between side surfaces 28 and 29. An elongated light source 24 is installed proximate the wide edge 26 of the waveguide 21 and a novel matrix of tilting micro-mirrors 33 is constructed on upper surface 30 of the waveguide. In FIG. 2, one column of the tilting micro-mirrors is designated as 33a, 33b, 33c, 33d, 33e and 33f.

Now referring to FIG. 3 of the drawings, groove 33e, which is generally representative of all of the grooves formed on the upper surface 30 of the waveguide 21 can be seen to comprise three optically flat facets 34, 35 and 36. As illustrated in FIGS.

2 and 3, optically flat facets 34 are inclined downwardly at a steep angle of between about 80 and 90 degrees with respect to the upper surface 30. Second facets 35 are recessed from and generally parallel to the upper surface 30 and facets 36 are upwardly inclined at angles between about 45 and about 60 degrees with respect to upper surface 30.

As further illustrated in FIG. 3 multi-layer film coatings are applied on facets 35 and 36. More particularly, a first layer 37 that comprises a light-absorbing black polymer film is deposited only on facets 36. A second layer 38 that comprises a conductive specularly reflective mirror film formed from a material such as an aluminum alloy is deposited on facets 35 and on light-absorbing layer 37. A third layer 39, that here comprises a transparent electrical insulator, is deposited on conductive mirror film layer 38 only on the flat horizontal sections thereof.

FIG. 3 also illustrates one of tilting micro-mirrors 33e of the present form of the invention. Micro-mirror 33e, which typifies the construction of each of the micro-mirrors of the invention, comprises a thin aluminum alloy elastic film that is affixed to the upper surface 30 of the waveguide 21. In order to bend the micro-mirror at the tilt axis 42 (see FIG. 3), the thickness of each of the micro-mirrors is reduced at the junction of the downwardly inclined facets 34 with the upper surface 30 of the waveguide 21. For absorbing external light, a thin black polymer film 41 is deposited on upper surface of each micro-mirror. Alternately, the upper surface of the micro-mirror can be blackened by means of a black oxidation process of a character well understood by those skilled in the art.

In the present form of the invention, the tilting micro-mirrors 33 operate by electrostatic attraction force and by the counter spring forces generated by the elastic film. The conductive mirror films 38 act as fixed electrodes for the tilting micro-mirrors 33. When a suitable voltage "V" is applied between the fixed conductive mirror films 38 and a micro-mirror 33, the micro-mirror tilts by electrostatic attraction force and, when no voltage is applied, the micro-mirror is returned to the flat position by the counter spring force of the elastic film. It is to be understood that instead of grooves, appropriately configured cavities can be formed on the upper surface 30 of the wave guide and the tilting micro-mirrors can be received within the cavities rather than within the grooves.

As best seen in FIG. 2 of the drawings, light rays 43 entering from the wide edge 26 of the waveguide 21 are uniformly distributed in the light propagation direction of the X-axis by total internal reflections and exit the waveguide 21 from downwardly inclined facets 34. Depending on the positions of the tilting micro-mirrors, light rays are absorbed, or directed, to the viewer.

When a tilting micro-mirror is in the flat position, such as micro mirrors 33c and 33d (FIG. 2), light rays reflect from the lower light reflecting surfaces of the micro-mirrors and mirror coatings 38 and are directed to the viewer. When a micro-mirror is tilted down, such as micro-mirrors 33a and 33b, light rays reflect from the lower light reflecting surface of the micro-mirror and mirror coatings 38 and change the angles towards the normal. After multiple reflections, light rays lose their energy and the light is absorbed. Some light rays may change their angles of reflection by reflecting from the micro-mirrors and mirror coatings 38 and such light rays re-enter the light guide from downwardly inclined facets 34 and travel backwards to the direction of the light source. (See micro-mirrors 33e and 33f as shown in FIGS. 2 and 3.) Light rays traveling backwards are absorbed by light-absorbing layers 37.

Depending on the display size and resolution, each picture element may include several tilting micro-mirrors.

It is to be understood that all micro-mirrors for each picture element tilt simultaneously when suitable voltage is applied between the fixed electrodes 38 and selected group of micro-mirrors.

Referring now to FIG. 4 of the drawings, a cross-sectional view of the second embodiment of display of the present invention is there shown and generally designated by the numeral 44. This second embodiment is similar in some respect to the embodiment shown in FIGS. 1 and 2 of the drawings and like numbers are used in FIG. 4 to identify like components.

The display 44 includes a generally rectangular shaped optical waveguide 45 that is substantially wedge-shaped cross section. Waveguide 45 is constructed from an optically transparent material such as acrylic or glass and comprises of generally parallel first and second end surfaces 46 and 57 that are joined by generally parallel side surfaces. Like display 20, display 44 also includes a specially configured major upper surface 49 and an upwardly inclined lower surface 47. As before, a plurality of equally spaced-apart grooves 50 is formed on upper surface 49 and extends between the generally parallel sides. An elongated light source 24 is installed proximate the wide edge 46 of the waveguide 45 and a novel matrix of tilting micro-mirrors 51 is constructed on upper surface 49 of the waveguide 45. In FIG. 4 of the drawings one column of the tilting micro-mirrors of the invention can be seen to comprise micro-mirrors 51a, 51b, 51c, 51d, 51e and 51f.

Turning to FIG. 5, the groove 50, that is there shown is representative of all of the grooves 50 formed on the upper surface 49 of the waveguide 45, and can be seen to comprise two optically flat facets 52 and 53. Optically flat facet 52 is inclined downwardly at a steep angle between about 80 and about 90 degrees with respect to the upper surface 49. Second facet 53 is inclined upwardly at an angle between about 5 degrees and about 15 degrees with respect to the upper surface 49. Two layer film coatings are applied on facets 53. The first layer 54 comprises a conductive specularly reflecting mirror, while the second layer 55 comprises a light-absorbing electrical insulator.

FIG. 5 also illustrates the construction of tilting micro-mirror 51e. Micro-mirror 51e, which is representative of all of the tilting micro-mirrors of this form of the invention, here comprises a thin aluminum alloy elastic film that is attached to the upper surface 49 of the waveguide 45. In order for the micro-mirror to appropriately bend at the tilt axis 56, the thickness of each of the micro-mirrors is reduced in the manner previously described. As before, the tilting micro-mirrors 51 are operated by electrostatic attraction force and by the counter spring force of the elastic film. The conductive mirror films 54 act as fixed electrodes for the tilting micro-mirrors 51. When suitable voltage "V" is applied between the fixed conductive mirror films 54 and a micro-mirror 51, the micro-mirror tilts by electrostatic attraction force and, when no voltage is applied, the micro-mirror returns to the flat position due to the counter spring forces of the elastic film.

As best seen in FIG. 4 of the drawings, light rays 43 entering from the wide edge 46 of the waveguide 45 are uniformly distributed in the light propagation direction of the X-axis by total internal reflections and exit the waveguide 45 from downwardly inclined facets 52. Depending on the positions of the tilting micro-mirrors, light rays are either absorbed, or selectively directed to the viewer. When a tilting micro-mirror is in the flat position (see Micro-mirrors 51a, 51b, 51e and 51f in FIG. 4), light rays reflect from the lower light reflecting surface of micro-mirrors and are absorbed by the light-absorbing layers 55. When a micro-mirror is in the tilted down position, such as the micro-mirrors 51*c* and 51*d* shown in FIG. 4, light rays reflect from the upper light reflecting surface of the micro-mirror and are directed to the viewer.

It is to be understood that instead of grooves, appropriately configured cavities can be formed on the upper surface of the waveguide and the tilting micro-mirrors can be received within the cavities rather than within the grooves.

Referring now to FIG. 6 of the drawings, still another alternate embodiment of the display of the latest embodiment is there shown and generally designated by the numeral 62. This latest embodiment is similar in some respect to the embodiments shown in FIGS. 1 and 2 of the drawings and like numbers are used in FIG. 6 to identify like components.

The display 62 here includes a generally rectangular shaped optical waveguide 63 that is substantially wedge-shaped cross section. As before, waveguide 63 is constructed of an optically transparent material such as acrylic or glass, and comprises generally parallel first and second end surfaces 66 and 68 that are joined by generally parallel side surfaces. Waveguide 63 also comprises a specially configured major upper surface 65 and an upwardly inclined lower surface 64. An elongated light source 24 is installed proximate wide edge 66 of the waveguide 63. Formed on the upper surface 65 of the wave guide is a plurality of equally spaced-apart grooves 69 that extend between the sides. A plurality of micro-prisms 70 are dispensed within the grooves 69 and a matrix of picture elements 67 is assembled proximate the upper surface of the waveguide 63. In FIG. 6, one column of the picture elements can be seen to comprise picture element 67*a*, 67*b* and 67*c*.

Referring to FIG. 7, one of the grooves 69, which is representative of all of the grooves formed on the upper surface 65 of the waveguide 63, can be seen to comprise optically flat facets 71, 72 and 73. Optically flat facet 71 is inclined downwardly at a relatively steep angle between about 80 and about 90 degrees with respect to the upper surface 65. Second facet 72 is recessed from and generally parallel to the upper surface 65, while facet 73 is upwardly inclined at an angle between about 45 to about 60 degrees with respect to the upper surface 65.

As further illustrated in FIG. 7, multi-layer film coatings are applied to facets 72, 73 and to the upper surface 65 of the waveguide 63. First layer 74, which is formed from a material such as aluminum here, comprises a conductive specularly reflecting mirror film. Second layer 76 here comprises a light-absorbing black polymer insulator film that is deposited on the mirror film 74. Third layer 75 comprises a cladding that is applied only to the flat lower sections of light-absorbing layer 76. Cladding, which is well known to those skilled in fiber optics technology, comprises a transparent dielectric material that is coated on the surface of a fiber or on the waveguide and preferably has lower refractive index to facilitate total internal reflections.

Also illustrated in FIG. 7 is one of micro-prisms 70 that resides within one of the grooves 69. To construct each of the micro-prisms 70, a UV-hardening transparent liquid polymer is deposited into the grooves 69. The polymer preferably has the same refractive index as does the waveguide 63 following the application of the coatings 74, 76 and 75. Each micro-prism comprises a light input facet 80 that is optically coupled to a selected one of the downwardly inclined facets 71 of the grooves 69. In a similar fashion, a second facet 81 is optically coupled to a selected one of the light-absorbing films 76 and a third facet 83 is optically coupled to cladding layer 75. The fourth facet 82 here comprises a light exit facet.

Also depicted in FIG. 7 is picture element 67*c* that is assembled proximate the upper surface of the waveguide 63 using spacers 84 that are manufactured with alternating heights. The construction of picture element 67*c* is representative of the construction of all of the picture elements shown in FIG. 6. Picture elements 67 here comprise electrically activated micro-mechanical actuators that are constructed from transparent materials having the same or greater refractive index as do the micro-prisms 70 and each has a light diffusing upper surface. In operation, the conductive mirror films 74 act as a fixed electrode for picture elements 67. Each picture element 67 comprises a transparent elastic film 85, a light diffusing section 77 formed from a rigid transparent material, a light coupling section 78 formed from a relatively soft transparent material and an electrode 79 formed from an opaque conductive material.

Turning next to FIGS. 6 and 7, it can be seen that light rays 43 entering from the wide edge 66 of the waveguide 63 are uniformly distributed in the light propagation direction of the X-axis by total internal reflections and exit the waveguide 63 from downwardly inclined facets 71. As best seen in FIG. 7, light rays exiting the waveguide 63 enter the micro-prisms 70 from light input facets 80. Inside of the micro-prisms 70 the light rays propagate by total internal reflections from the upper surface 82 and from the lower surface 83 of the micro-prisms 70 until they reach the light-absorbing layer 76 formed on upwardly inclined facets 73. To modulate light, suitable voltage "V" is applied between fixed conductive mirror films 74 and the respective electrodes 79 of the picture elements. This causes the picture elements such as element 67*b* to move by attractive electrostatic force at close distance to the upper surface of the micro-prisms 70 within a fraction of the wavelength. Light rays penetrate from the upper surface of the micro-prisms 70 into the picture element 67*b* by coupling to evanescent waves and exit the upper light diffusing surface of the picture element 67*b*.

Referring now to FIG. 8 and FIG. 9 of the drawings, still another alternate embodiment of the display of the latest embodiment is there shown and generally designated by the numeral 90. This latest embodiment is similar in some respect to the embodiments shown in FIG. 6 and FIG. 7 of the drawings and like numbers is used in FIG. 8 and FIG. 9 to identify like components.

The main difference between this latest embodiment and that shown in FIG. 6 and FIG. 7 of the drawings concerns the construction of the picture elements and optical coatings that are applied to the facets of the optical waveguide.

The display 90 here includes a generally rectangular shaped optical waveguide 63 that is substantially wedge-shaped cross section. As before, waveguide 63 is constructed of an optically transparent material such as acrylic or glass, and comprises generally parallel first and second end surfaces 66 and 68 that are joined by generally parallel side surfaces. Waveguide 63 also comprises a specially configured major upper surface 65 and an upwardly inclined lower surface 64. An elongated light source 24 is installed proximate wide edge 66 of the waveguide 63. Formed on the upper surface 65 of the wave guide is a plurality of equally spaced-apart grooves 69 that extend between the sides. A plurality of micro-prisms 70 are dispensed within the grooves 69 and a matrix of picture elements 67 is assembled proximate the upper surface of the waveguide 63. In FIG. 8, one column of the picture elements can be seen to comprise picture element 92*a*, 92*b* and 92*c*.

Referring to FIG. 9, one of the grooves 69, which is representative of all of the grooves formed on the upper surface 65 of the waveguide 63, can be seen to comprise optically flat facets 71, 72 and 73. Optically flat facet 71 is inclined downwardly at a relatively steep angle between about 80 and about 90 degrees with respect to the upper surface 65. Second facet 72 is recessed from and generally parallel to the upper surface 65, while facet 73 is upwardly inclined at an angle between about 45 to about 60 degrees with respect to the upper surface 65.

As further illustrated in FIG. 9, a conductive specularly reflecting mirror film 74 is formed from a material such as aluminum on facets 72, 73 and to the upper surface 65 of the waveguide 63.

Also illustrated in FIG. 7 is one of micro-prisms 70 that resides within one of the grooves 69. Each micro-prism comprises a light input facet 80 that is optically coupled to a selected one of the downwardly inclined facets 71 of the grooves 69. In a similar fashion, a second facet 81 and a third facet 83 are optically coupled to a selected one of the light reflecting mirror films 74. The fourth facet 82 here comprises a light exit facet.

Also depicted in FIG. 9 is picture element 92c that is assembled proximate the upper surface of the waveguide 63 using spacers 84 that are manufactured with alternating heights. The construction of picture element 92c is representative of the construction of all of the picture elements shown in FIG. 8. Picture elements 92 here comprise electrically activated micro-mechanical actuators that are constructed from transparent materials having the same or greater refractive index as do the micro-prisms 70. In operation, the conductive mirror films 74 act as a fixed electrode for picture elements 92. Each picture element 92 comprises a transparent elastic film 85, a light diffusing section 77 formed from a rigid transparent material, a light coupling section 93 formed from a relatively soft light absorbing material and an electrode 79 formed from an opaque conductive material.

Turning next to FIG. 8 and FIG. 9, it can be seen that light rays 43 entering from the wide edge 66 of the waveguide 63 are uniformly distributed in the light propagation direction of the X-axis by total internal reflections and exit the waveguide 63 from downwardly inclined facets 71. Light rays exiting the waveguide 63 enter the micro-prisms 70 from light input facets 80. Inside of the micro-prisms 70, the light rays propagate by total internal reflections from the upper surface 82 and from the lower surface 83 of the micro-prisms 70. Light rays that reach the light reflecting layer 74 formed on upwardly inclined facets 73 are deflected to the viewer (see FIG. 9).

When suitable voltage "V" is applied between fixed conductive mirror films 74 and the respective electrodes 79 of the picture elements, the picture elements such as 92b shown in FIG. 8 move by attractive electrostatic force at close distance to the upper surface of the micro-prisms 70 within a fraction of the wavelength. Light rays penetrate from upper surface 82 of micro-prisms 70 to light absorbing section 93 of picture element 92b.

Yet another alternate form of display of the invention is shown in FIG. 10 and is generally designated by the numeral 95. The main difference between this latest embodiment and that shown in FIG. 4 of the drawings concerns the installation of a prism film 96 at the upper surface of the display 44. Prism film 96 functions to improve the viewing angles of the display and enhances the contrast at high levels of ambient light.

Prism film 96 is preferably constructed from a transparent polymer and has a major planar upper surface 97 and a lower surface that includes alternating downwardly inclined flat facets 98 and upwardly inclined flat facets 99. Facets 98 are downwardly inclined at angles between about 80 to about 90 degrees, while facets 99 are upwardly inclined at angles between about 40 to about 60 degrees with respect to the upper surface 97. Two coating layers are applied to upwardly inclined facets 99. The first layer comprises a cladding 100 and the second layer comprises a light-absorbing layer 101.

As shown in the FIG. 10, light rays are emitted from the display 44 at oblique angles of less than 45 degrees with respect to the display surface. The light rays emitted from the display 44 enter the prism film from the downwardly inclined facets 98 and deflect from upwardly inclined facets 99 towards the normal. This improves the viewing angles of the display.

To illustrate the ambient light-absorbing feature of the prism film 96, an external light source 102 is placed near the upper surface 97 of the prism film 96. Light rays emitted from the external light source 102 reflect from downwardly inclined facets 98, upwardly inclined 99, or from the upper surface of the micro-mirrors and are absorbed by the light-absorbing layer 101. This substantially improves the display contrast for viewing in high levels of ambient light. Instead of cladding and light-absorbing layers, a conductive specularly reflecting mirror film formed from an aluminum alloy can be coated on facets 99. Similarly, the outside surface of the mirror film can be blackened by means of a black oxidation process. In any event, the optical functionality will be substantially the same and the viewer will see a black surface when no light is emitted from the display and most of ambient light will be absorbed by the black oxide layer. Electrically, this can be used as a second fixed electrode for the tilting micro-mirrors.

Two alternative uses for these conductive mirror films are as an electrostatic shield to prevent external electrostatic discharge to the display and as an EMI shield to reduce electromagnetic emission from the display.

For color displays wherein each picture element comprises red, green and blue sub-pixels, one form of optical waveguide having embedded dichroic color filters is illustrated in FIG. 11 and generally designated by the number 104.

Waveguide 104 here comprises first and second sections 105 and 106. First section 105 is preferably constructed from optically transparent material such as acrylic or glass, and has a planar upper surface 108. Second section 106 includes stripes of dichroic mirror coatings 107r, 107g and 107b which are deposited on the planar upper surface 108 and slices of a substantially transparent material 109 which are selectively deposited on the dichroic mirrors. Slices 109 preferably have substantially the same refractive index as does section 105.

In operation, the Dichroic filters 107r transmit red light and reflect green and blue light, the dichroic filters 107g transmit green light and reflect red and blue light, and the dichroic filters 107b transmit blue light and reflect red and green light.

It is to be understood that, while the previously described embodiments of the invention involve the use of an edge-lit optical waveguide having a wedge shape cross section, many other designs of optical waveguides can be used. Similarly, while the previously described embodiments comprise grooves or cavities formed on a planar surface of the waveguide, the various components can also be built up from a flat planar surface, or alternately can be formed on a separate substrate that can be combined with a backlight assembly.

Having now described the invention in detail in accordance with the requirements of the patent statutes, those skilled in this art will have no difficulty in making changes and modifications in the individual parts or their relative assembly in order to meet specific requirements or conditions. Such changes and modification may be made without departing from the scope and spirit of the invention, as set forth in the following claims.

We claim:

1. A display comprising:
   (a) an optical waveguide for receiving and distributing light, having an upper surface and a spaced-apart lower surface, a plurality of light exit facets extending downwardly from said upper-surface and a plurality of recessed light reflecting facets interleaved with said light exit facets, said recessed light reflecting facets including a fixed electrode for electrostatic activation, and
   (b) a plurality of micro-mechanical picture elements disposed proximate said upper surface of said waveguide each adapted to modulate light exiting from a selected one of said light exit facets, and wherein most light exiting each said light exit facet of said optical waveguide is selectively directed to the viewer or to a light absorber, wherein each of said micro-mechanical picture elements includes a tilting micro-mirror having a tilt axis substantially parallel to a selected one of said light exit facets of said waveguide and actuated by an electrostatic force to selectively tilt said micro-mirror against a selected one of said recessed light reflecting facets.

2. A display comprising:
   (a) an optical waveguide for receiving and distributing light, having an upper surface and a spaced-apart lower surface, a plurality of light exit facets extending downwardly from said upper-surface and a plurality of recessed light reflecting facets interleaved with said light exit facets, said recessed light reflecting facets including a fixed electrode for electrostatic activation, and
   (b) a plurality of micro-mechanical picture elements disposed proximate said upper surface of said waveguide, and wherein most light exiting each said light exit facet of said optical waveguide is selectively directed along a first light path to the viewer or along a second light path to a light absorber, wherein each of said micro-mechanical picture elements includes a tilting micro-mirror having a tilt axis substantially parallel to a selected one of said light exit facets of said waveguide and actuated by an electrostatic force to selectively tilt said micro-mirror against a selected one of said recessed light reflecting facets.

3. The display as defined in claim 1 or 2 in which a specular tight reflecting conductive film is formed on each said recessed light reflecting facets of said waveguide.

4. The display as defined in claim 1 or 2 in which each tilting micro-mirror has a fixed portion that is affixed on said upper surface of said waveguide constructed from a conductive material.

5. The display as defined in claim 1 or 2 in which each tilting micro-mirror has a specular light reflecting lower surface and light absorbing upper surface.

6. The display as defined in claim 1 or 2 in which each of said micro-mechanical picture element includes a plurality of tilting micro-mirrors and in which said plurality of tilting micro-mirrors tilt generally in the same direction.

7. The display as defined in claim 1 or 2 in which each of said micro-mechanical picture element includes a plurality of tilting micro-mirrors which tilt generally in the same direction simultaneously.

8. The display as defined in claim 1 or 2 in which each of said micro-mechanical picture element includes an electrostatic actuator and in which said plurality of micro-mechanical picture elements actuate simultaneously to display an image.

9. The display as defined in claim 1 or 2 in which said optical waveguide further includes a plurality of upwardly inclined facets each located between said upper and lower surfaces and each said recessed facet is disposed between a selected one of said light exit facets and a selected one of said upwardly inclined facets.

10. The display as defined in claim 1 or 2 in which said optical waveguide further includes a plurality of upwardly inclined facets each located between said upper and lower surface; and each said upwardly inclined facet extends between approximately 40 degrees and approximately 60 degrees relative to said upper surface of said optical waveguide.

11. The display as defined in claim 1 or 2 in which said optical waveguide further includes a plurality of upwardly inclined facets each located between said upper and lower surfaces and in which a specularly reflective film is applied on said upwardly inclined facets.

12. The display as defined in claim 1 or 2 in which said optical waveguide further includes a plurality of upwardly inclined facets each located between said upper and lower surfaces and in which a light absorbing coating is applied on said upwardly inclined facets and a specularly reflective film is formed on said light absorbing coating.

13. The display as defined in claim 1 or 2 in which a specularly reflective film is formed on each of said recessed facets of said waveguide and in which a light absorbing coating is formed on said specularly light reflecting film.

14. The display as defined in claim 1 or 2 in which said recessed facets of said waveguide are substantially parallel to said upper surface of said waveguide.

15. The display as defined in claim 1 or 2 in which each of said light exit facets extends at an angle of between approximately 80 degrees and approximately 90 degrees relative to said upper surface of said optical waveguide.

16. The display as defined in claim 1 or 2 in which a specularly light reflecting film is formed on each of said recessed light reflecting facets of said waveguide and in which a transparent insulator is formed on each of said specularly light reflecting film.

17. The display as defined in claim 1 or 2 in which said optical waveguide having a wedge-shaped cross section.

18. The display as defined in claim 1 or 2 in which said optical waveguide further including embedded dichroic filters.

19. The display as defined in claim 1 or 2 in which each of said recessed light reflecting facets of said waveguide is coated with a specularly light reflecting coating, and in which a light absorbing coating is formed on said specularly light reflecting coatings, and cladding is formed on each of said light absorbing coatings.

* * * * *